US011974168B2

(12) United States Patent
Huang

(10) Patent No.: US 11,974,168 B2
(45) Date of Patent: Apr. 30, 2024

(54) METHOD FOR DATA TRANSMISSION THROUGH COMMUNICATION LINK, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 243 days.

(21) Appl. No.: 17/492,661

(22) Filed: Oct. 3, 2021

(65) Prior Publication Data

US 2022/0030469 A1 Jan. 27, 2022

Related U.S. Application Data

(63) Continuation of application No. PCT/CN2020/080424, filed on Mar. 20, 2020.

(30) Foreign Application Priority Data

Apr. 8, 2019 (CN) .......................... 201910278001.5

(51) Int. Cl.
*H04W 28/00* (2009.01)
*A63F 13/87* (2014.01)
(Continued)

(52) U.S. Cl.
CPC ............. *H04W 28/22* (2013.01); *A63F 13/87* (2014.09); *H04W 4/16* (2013.01); *H04W 24/02* (2013.01);
(Continued)

(58) Field of Classification Search
None
See application file for complete search history.

(56) References Cited

U.S. PATENT DOCUMENTS 7,881,180 B2 * 2/2011 Geile ................. H04J 14/0298
370/204
9,137,739 B2 * 9/2015 Raleigh ................... H04W 8/20
(Continued)

FOREIGN PATENT DOCUMENTS

| CN | 103501506 | 1/2014 |
|---|---|---|
| CN | 105828455 | 8/2016 |

(Continued)

OTHER PUBLICATIONS

WIPO, International Search Report for PCT/CN2020/080424, dated May 29, 2020.
(Continued)

*Primary Examiner* — Gerald A Smarth
(74) *Attorney, Agent, or Firm* — Hodgson Russ LLP

(57) ABSTRACT

A method for data transmission, an electronic device, and a storage medium are provided. The method includes the following. A transmission state of voice data packets of a game application running in a foreground of the electronic device is obtained. A first communication link established by the electronic device is determined and at least one second communication link is established, upon detecting that the transmission state satisfies a preset condition, where the transmission state satisfying the preset condition indicates that the first communication link suffers from a large network delay or is unstable. The voice data packets are transmitted through at least one of the first communication link and the at least one second communication link, where some or all data packets among the voice data packets are
(Continued)

transmitted through at least one target communication link in the at least one second communication link.

17 Claims, 5 Drawing Sheets

(51) Int. Cl.
    *H04W 4/16*     (2009.01)
    *H04W 24/02*     (2009.01)
    *H04W 28/02*     (2009.01)
    *H04W 28/22*     (2009.01)
    *H04W 76/15*     (2018.01)

(52) U.S. Cl.
    CPC ....... *H04W 28/0268* (2013.01); *H04W 76/15* (2018.02)

(56) References Cited

U.S. PATENT DOCUMENTS

| | | | | |
|---|---|---|---|---|
| 2016/0381202 | A1* | 12/2016 | Koo | ............... G06F 1/1632 |
| | | | | 455/559 |
| 2017/0214626 | A1 | 7/2017 | Dunlap et al. | |
| 2018/0139131 | A1 | 5/2018 | Ignatchenko | |
| 2018/0374111 | A1* | 12/2018 | Corry | ............... G06Q 30/0207 |
| 2020/0092295 | A1* | 3/2020 | Hartley | ............... H04L 41/12 |

FOREIGN PATENT DOCUMENTS

| | | | | |
|---|---|---|---|---|
| CN | 106851738 | | 6/2017 | |
| CN | 108322599 | | 7/2018 | |
| CN | 109412900 | | 3/2019 | |
| CN | 109474521 | A | 3/2019 | |
| CN | 109495880 | A | 3/2019 | |
| CN | 109587719 | | 4/2019 | |
| WO | 2014198048 | | 12/2014 | |
| WO | WO-2015039691 | A1* | 3/2015 | ............ H04J 3/0632 |
| WO | WO-2020118498 | A1* | 6/2020 | |

OTHER PUBLICATIONS

CNIPA, First Office Action for CN Application No. 201910278001.5, dated Mar. 1, 2021.
EPO, Extended European Search Report for EP 20787249.0, dated May 2, 2022.

\* cited by examiner

METHOD FOR DATA TRANSMISSION THROUGH COMMUNICATION LINK, ELECTRONIC DEVICE, AND STORAGE MEDIUM

CROSS-REFERENCE TO RELATED APPLICATION(S)

This application is a continuation of International Application No. PCT/CN2020/080424, filed on Mar. 20, 2020, which claims priority to Chinese Patent Application No. 201910278001.5, filed on Apr. 8, 2019, the entire disclosures of which are hereby incorporated by reference.

TECHNICAL FIELD

This disclosure relates to the technical field of electronic devices, and particularly to a method for data transmission, an electronic device, and a storage medium.

BACKGROUND

With the development of mobile communication technology, the demands of users for data communication are increasing. Particularly, when the user transmits data via instant communication, for example, transmitting audio data via instant communication in a gaming process, a large network delay will occur if the quality of data communication is low.

Currently, when transmitting data via electronic devices available, for example, a smart phone, the user generally will adopt a cellular mobile network communication or wireless-fidelity (Wi-Fi) communication. In this case, the electronic device needs to compete with other devices in the same area for wireless link resources, which makes it hard to meet the demands of the user for internet access.

SUMMARY

Implementations of this application provide a method for data transmission, an electronic device, and a storage medium, to reduce a data transmission delay of voice data packets and improve a data transmission speed.

In a first aspect, implementations of this application provide a method for data transmission. The method is for an electronic device and includes the following.

A transmission state of voice data packets of a game application running in a foreground of the electronic device is obtained. A first communication link established by the electronic device is determined and at least one second communication link is established, upon detecting that the transmission state satisfies a preset condition, where the transmission state satisfying the preset condition indicates that the first communication link suffers from a large network delay or is unstable. The voice data packets are transmitted through at least one of the first communication link and the at least one second communication link, where some or all data packets among the voice data packets are transmitted through at least one target communication link in the at least one second communication link.

In a second aspect, implementations of this application provide an electronic device. The electronic device includes a transceiver, at least one processor, and a memory, coupled to the at least one processor and storing computer executable instructions thereon. The computer executable instructions, when executed by the at least one processor, causes the at least one processor to: obtain a transmission state of voice data packets of a game application running in a foreground of the electronic device, and determine a first communication link established by the electronic device and establish at least one second communication link, upon detecting that the transmission state satisfies a preset condition, where the transmission state satisfying the preset condition indicates that the first communication link suffers from a large network delay or is unstable. The computer executable instructions, when executed by the at least one processor, causes the transceiver to: transmit the voice data packets through at least one of the first communication link and the at least one second communication link, where some or all data packets among the voice data packets are transmitted through at least one target communication link in the at least one second communication link.

In a third aspect, implementations of this application provide a non-transitory computer readable storage medium. The non-transitory computer readable storage medium stores a computer program. The computer program, when executed by a processor, causes the processor to: obtain a transmission state of voice data packets of a game application running in a foreground of an electronic device, and determine a first communication link established by the electronic device and establish at least one second communication link, upon detecting that the transmission state satisfies a preset condition, where the transmission state satisfying the preset condition indicates that the first communication link suffers from a large network delay or is unstable. The computer program, when executed by the processor, causes a transceiver to: transmit the voice data packets through at least one of the first communication link and the at least one second communication link, where some or all data packets among the voice data packets are transmitted through at least one target communication link in the at least one second communication link.

BRIEF DESCRIPTION OF THE DRAWINGS

The following detailed description will be made with the accompanying drawings related to the implementations of this application hereinafter.

DETAILED DESCRIPTION

In order to enable those skilled in the art to better understand solutions of this application, technical solutions in implementations of this application will be described clearly and completely hereinafter with reference to the accompanying drawings in the implementations of this application. Apparently, the described implementations are merely some rather than all implementations of this application. All other implementations obtained by those of ordinary skill in the art based on the implementations of this application without creative efforts shall fall within the protection scope of this application.

The terms "first", "second", and the like used in the specification, the claims, and the accompany drawings of this application are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of this application. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of this application may be capable of data transmission and may include various handheld devices, in-vehicle devices, wearable devices, computing devices that have wireless communication functions or other processing devices connected to the wireless modem, as well as various forms of user equipments (UE), mobile stations (MS), terminal devices, and the like.

Hereinafter, the implementations of this application will be described in detail.

Figure 1:
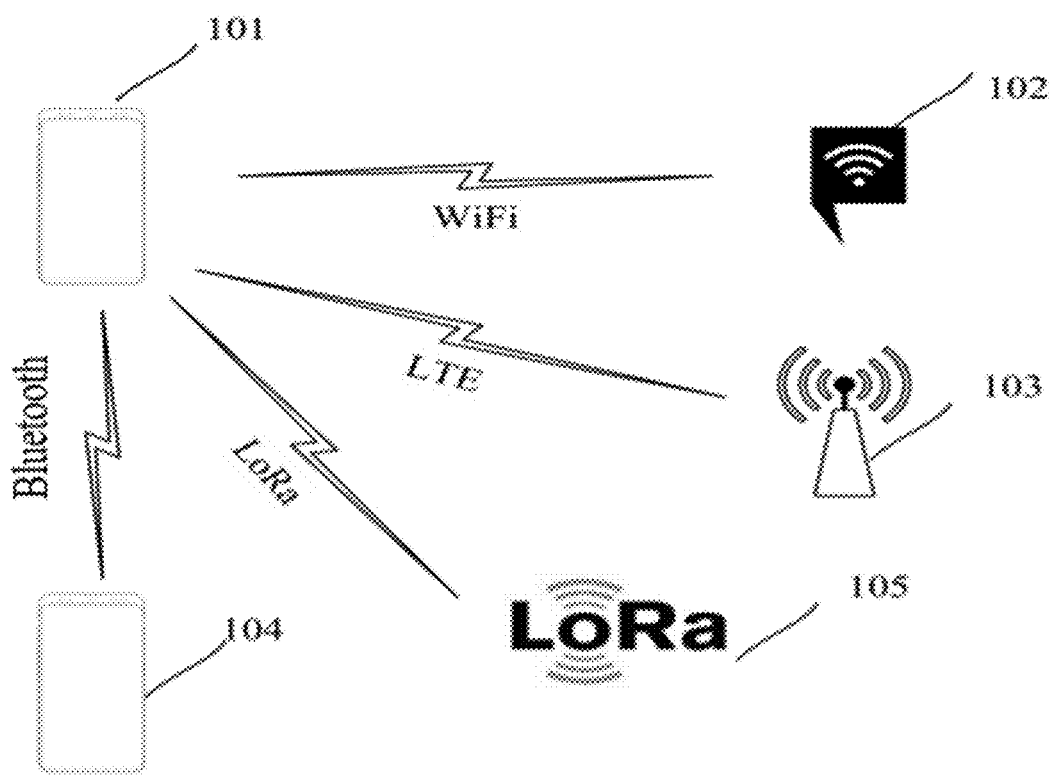
FIG. 1 is a schematic architectural diagram illustrating a wireless communication system in which an electronic device is located provided by implementations of this application.

Link aggregation enables the device available for internet access with more or more network interfaces at the same time. For example, through link aggregation, a mobile phone can be available for internet access via a Wi-Fi network and a data network at the same time. For Android system, when the Wi-Fi network is enabled, the data network is not available (a network scoring mechanism (Network Factory) of Connectivity Service disconnects the data network), whereas link aggregation requires two or more than two available networks. Therefore, a prerequisite for service-level agreement (SLA) is coexistence of the Wi-Fi network and the data network. With reference to FIG. 1, currently, an electronic device 101 can be connected with a data network 103, i.e., a communication network used to transmit data service. The electronic device 101 can be connected with Wi-Fi network 102, where Wi-Fi is a technology enabling connection of the electronic device to a wireless local area network and uses the radio frequency band usually of 2.4G ultra high frequency (UHF) or fifth generation (5G) super high frequency (SHF) industrial scientific medical (ISM). The electronic device 101 can be connected with a Bluetooth communication 104, where the Bluetooth is a wireless technology and can realize short-range network sharing and data exchange among a fixed device, a mobile device, and a personal area network within a building (a UHF radio wave in a 2.4-2.485 GHz ISM band is usually used). The electronic device 101 can also be connected with a long range (LoRa) communication module, where the LoRa is a long-range wireless transmission technology based on spread spectrum technique.

Figure 2:
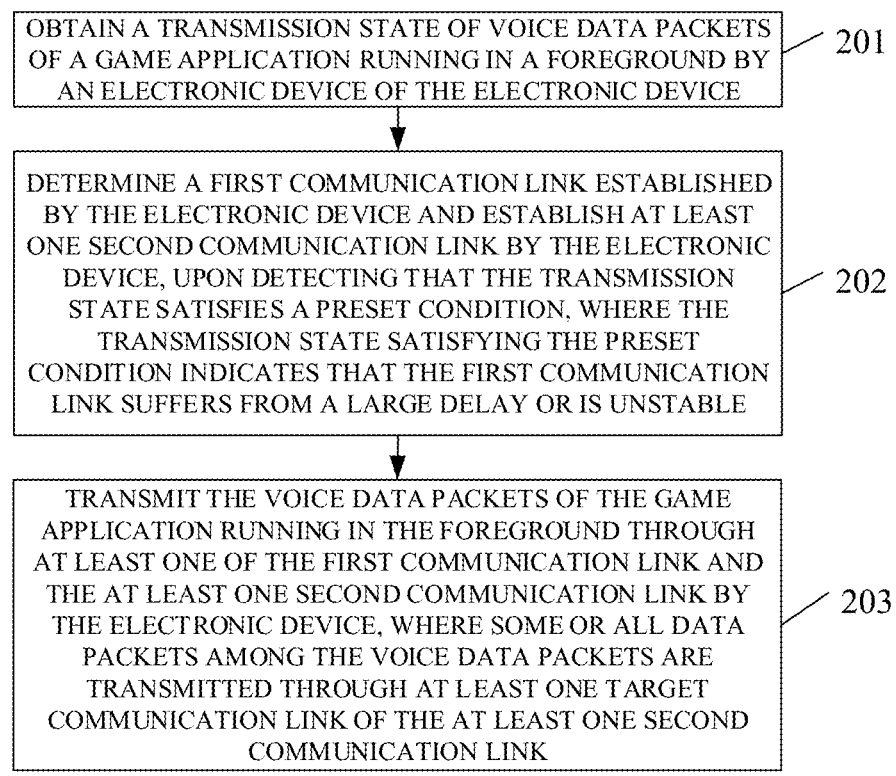
FIG. 2 is a schematic flow chart illustrating a method for data transmission provided by implementations of this application.

Referring to FIG. 2, FIG. 2 is a schematic flow chart illustrating a method for data transmission provided by implementations of this application, which is implemented in the electronic device in FIG. 1. As illustrated in FIG. 2, the method for data transmission includes the following.

At 201, the electronic device obtains a transmission state of voice data packets of a game application running in a foreground of the electronic device.

The game application running in the foreground is a game application currently running in the electronic device, that is, a game application currently displayed in a display interface of the electronic device.

The transmission state may be a successful transmission state or a failed transmission state of each of the voice data packets during a preset sampling period, the number of voice data packets transmitted successfully among the voice data packets during the preset sampling period, the number of voice data packets failed in transmission among the voice data packets during the preset sampling period, or a success rate or failure rate of the voice data packets transmitted during the preset sampling period, which is not limited thereto.

At 202, the electronic device determines a first communication link established by the electronic device and establishes at least one second communication link, upon detecting that the transmission state satisfies a preset condition, where the transmission state satisfying the preset condition indicates that the first communication link suffers from a large network delay or is unstable.

If at least one of the following is met, the electronic device determines that the transmission state satisfies the preset condition. The electronic device detects that the number of the voice data packets transmitted successfully among the voice data packets during the preset sampling period is less than a first threshold. The electronic device detects that the number of the voice data packets failed in transmission among the voice data packets during the preset sampling period is greater than or equals a first threshold A. The electronic device detects that the success rate of the voice data packets transmitted during the preset sampling period is less than a first preset success rate. The electronic device detects that the failure rate of the voice data packets transmitted during the preset sampling period is greater than or equals a second preset failure rate.

The first communication link or the at least one second communication link may be a long-term evolution (LTE) communication link, a 5G communication link, a Wi-Fi communication link, a LoRa communication link, or a Bluetooth communication link, which is not limited thereto.

At 203, the electronic device transmits the voice data packets of the game application running in the foreground through at least one of the first communication link and the at least one second communication link, where some or all data packets among the voice data packets are transmitted through at least one target communication link in the at least one second communication link.

The electronic device transmits the voice data packets of the game application running in the foreground through the at least one of the first communication link and the at least one second communication link (i.e., the first communication link and/or the at least one second communication link) in various ways. In an example, some voice data packets among the voice data packets of the game application running in the foreground are transmitted through the first communication link and the rest of the voice data packets of the game application running in the foreground (except for the "some data packets" as described above) are transmitted through the at least one second communication link. In another example, all voice data packets among the voice data packets of the game application running in the foreground are transmitted through the at least one second communication link, which is not limited thereto.

In the implementation, the electronic device obtains the transmission state of the voice data packets of the game application running in the foreground, and when the transmission state is detected to satisfy the preset condition, the electronic device determines the first communication link established by the electronic device and establishes the at least one second communication link, where the transmission state satisfying the preset condition indicates that the first communication link suffers from the large network delay or is unstable. Finally, the electronic device transmits the voice data packets of the game application running in the foreground are transmitted through the at least one of the first communication link and the at least one second communication link, where some or all data packets among the voice data packets are transmitted through the at least one target communication link in the at least one second communication link. It can be seen that, when the electronic device detects that the transmission state of the voice data packets of the game application running in the foreground satisfies the preset condition, the electronic device determines that the established first communication link suffers from the large network delay or is unstable, and in this case, the electronic device immediately establishes the at least one second communication link to help the first communication link transmit the voice data packets, which is possible to reduce a transmission delay of the voice data packets and improve a transmission speed.

In at least one implementation, the transmission state of voice data packets of the game application running in the foreground is obtained as follows. For each of the voice data packets of the game application running in the foreground, the transmission state during a preset sampling period is obtained for multiple times. The transmission state is detected to satisfy the preset condition as follows. A first quantity of voice data packets successfully transmitted during the preset sampling period each time is determined to obtain multiple first quantities, according to the transmission state of each of the voice data packets obtained for multiple times. It is detected that an amount of first quantities less than a first threshold is greater than a second threshold among the multiple first quantities.

The preset sampling period may be 1 s, 10 s, or 100 s etc. and the second threshold may be two, three, four, etc., which is not limited thereto.

The transmission state of each of the voice data packets during the preset sampling period may include the successful transmission state or the failed transmission state.

For example, the transmission state during the preset sampling period is obtained three times, the preset sampling period is 100 s, and the second threshold is two. The electronic device determines the number of voice data packets transmitted successfully within a first 100 s as a first quantity A according to a transmission state of each voice data packet within the first 100 s, the number of voice data packets transmitted successfully within a second 100 s as a first quantity B according to a transmission state of each voice data packet within the second 100 s, and the number of voice data packets transmitted successfully within a third 100 s as a first quantity C according to a transmission state of each voice data packet within the third 100 s. When, among the first quantity A, the first quantity B, and the first quantity C, the amount of first quantities being less than the first threshold is three, which is greater than two, that is, the first quantity A, the first quantity B, and the first quantity C are all less than the first threshold, the transmission state is determined to satisfy the preset condition.

In the implementation, the electronic device determines whether the transmission state of the voice data packets of the game application running in the foreground satisfies the preset condition according to the first quantity of voice data packets successfully transmitted during the preset sampling period obtained consecutively for multiple times, rather than for one time, which can improve an accuracy of determining a current network state and thus improve a stability of the data transmission.

In at least one implementation, the following is further executed. A first channel-quality parameter of the first communication link is obtained, upon detecting that an application running in the foreground is the game application. A second quantity of voice data packets successfully transmitted during a preset sampling period is determined, upon detecting that the first channel-quality parameter satisfies (i.e., falls in) a first channel-quality range. A second channel-quality range is determined according to the first channel-quality parameter, where each second channel-quality parameter in the second channel-quality range is less than the first channel-quality parameter. A third quantity of voice data packets successfully transmitted during the preset sampling period is determined for multiple times, upon detecting for multiple times that the first channel-quality parameter of the first communication link satisfies the second channel-quality range, where each third quantity corresponds to a different first channel-quality parameter of the first communication link. The first threshold is determined according to the second quantity and the third quantities.

Channel quality can be calculated according to a channel of a communication link. The channel-quality parameter may include a network speed, the network delay, a capacity of the channel, and other parameters, which are not limited thereto.

The first channel-quality range and the second channel-quality range each include a parameter range of each channel-quality parameter. The first channel-quality parameter(s) is detected to satisfy the first channel-quality range as follows. Each of the first channel-quality parameters is detected to satisfy a corresponding parameter range in the first channel-quality range.

The second channel-quality range can be determined according to the first channel-quality parameter in various ways. For example, the electronic device stores a first mapping between first channel-quality parameters and second channel-quality ranges. The electronic device queries the first mapping by using the first channel-quality parameter to determine the second channel-quality range corresponding to the first channel-quality parameter. For another example, the electronic device stores a second mapping between first channel-quality parameters and difference ranges. The electronic device queries the second mapping by using the first channel-quality parameter to determine a difference range corresponding to the first channel-quality parameter and calculates the second channel-quality range according to the difference range and the first channel-quality parameter. This application is not limited thereto.

Each second channel-quality parameter in the second channel-quality range less than the first channel-quality parameter means that each second channel-quality parameter is less than a corresponding first channel-quality parameter.

The third quantity of voice data packets successfully transmitted during the preset sampling period is determined for multiple times as follows, upon detecting for multiple times that the first channel-quality parameter of the first communication link satisfies the second channel-quality range. Each time the electronic device detects that the first channel-quality parameter of the first communication link satisfies the second channel-quality range, one third quantity is determined. Therefore, based on the above, multiple third quantities are determined, where each third quantity corresponds to a different first channel-quality parameter of the first communication link, but the first channel-quality parameter of the first communication link corresponding to each third quantity satisfies the second channel-quality range.

The first threshold is determined according to the second quantity and the third quantities in various ways. In at least one implementation, a difference between the second quantity and each of the third quantities is determined to obtain multiple differences, and a target difference in a preset difference range among the multiple differences is obtained. A third quantity corresponding to the target difference is determined as the first threshold. Alternatively, the difference between the second quantity and each of the third quantities is determined to obtain multiple differences, and multiple target differences in the preset difference range among the multiple differences are obtained. An average value of third quantities corresponding to the multiple target differences is determined as the first threshold, which is not limited thereto.

In the implementation, before obtaining the transmission state of the voice data packets of the game application running in the foreground, when the corresponding game application is running in the foreground of the electronic device, the electronic device will first obtain the second quantity of the voice data packets transmitted successfully when the channel quality of the first communication link is high, and then obtain the multiple third quantities when the channel quality of the first communication link is low. Thereafter, the first threshold when the second communication link needs to be established is determined. In this way, occasions for data transmission through multiple links can be more reasonable. Furthermore, the first threshold can also be accurately set, since the second channel-quality range is determined according to the first channel-quality parameter.

In at least one implementation, the following is further executed. Previous transmission data of the voice data packets of the game application is obtained. A maximum number and a minimum number of voice data packets successfully transmitted during multiple sampling periods are determined according to the previous transmission data, where the multiple sampling periods match a current time period. The first threshold is determined according to the maximum number and the minimum number.

The previous transmission data at least include the maximum number and the minimum number of voice data packets transmitted successfully detected in multiple preset sampling periods in each of multiple time periods during the use of the game application in the past. The multiple time periods refer to time periods within one day, for example, 9 o'clock-11 o'clock, 15 o'clock-17 o'clock, and 20 o'clock-22 o'clock, etc., which is not limited thereto.

In the implementation, the electronic device determines the first threshold according to the previous transmission data of the voice data packets of the game application, and thus the first threshold can be determined more intelligently. Furthermore, since each communication link has different transmission speed and bandwidth, etc., during different time periods, the first threshold is determined with regard to different time periods, and thus the first threshold can be determined more reasonably.

In at least one implementation, the first threshold is determined according to the maximum number and the minimum number as follows. An average value of the maximum number and the minimum number is determined as the first threshold, upon detecting that a difference between the maximum number and the minimum number is larger than a preset difference threshold. Alternatively, the minimum number is determined as the first threshold, upon detecting that the difference between the maximum number and the minimum number is less than or equals the preset difference threshold.

In the implementation, the electronic device determines the first threshold when the second communication link needs to be established according to a relationship between the preset difference threshold and the difference between the maximum number and the minimum number, such that the first threshold can be conveniently and reasonably determined.

In at least one implementation, the voice data packets of the game application running in the foreground are transmitted through the at least one of the first communication link and the at least one second communication link as follows. A location parameter of a target electronic device receiving the voice data packets is obtained. A distance parameter between the electronic device and the target electronic device is determined according to the location parameter. The at least one target communication link in the at least one second communication link is selected according to the distance parameter. The voice data packets of the game application running in the foreground are transmitted through the at least one of the first communication link and the at least one target communication link.

The at least one target communication link can be selected from the at least one second communication link according to the distance parameter in various ways. For example, according to different ranges where the location parameter locates, the at least one target communication link is selected from at least one available second communication link in a corresponding range. In detail, the at least one target communication link is selected in the corresponding range according to the channel quality or transmission speed of each of the at least one available second communication link, which is not limited thereto.

The at least one target communication link is selected from the at least one second communication link according to the distance parameter as follows. For example, if the first communication link is an LTE communication link, when the distance parameter is less than a preset reference distance threshold, a Bluetooth communication link or a LoRa communication link can be selected; when the distance parameter is greater than the preset reference distance threshold, a Wi-Fi communication link and etc. can be selected. For another example, if the first communication link is the Wi-Fi communication link, when the distance parameter is less than the preset reference distance threshold, the Bluetooth communication link or the LoRa communication link can be selected; when the distance parameter is greater than the preset reference distance threshold, the LTE communication link or a 5G communication link can be selected. This application is not limited thereto.

In the implementation, the electronic device selects the at least one target communication link according to the distance parameter between the electronic device and the target electronic device, which can improve the accuracy of selecting the target communication link and thus increase the data transmission speed.

In at least one implementation, the at least one target communication link in the at least one second communication link is selected according to the distance parameter as follows. A wireless local area network is determined upon detecting that the distance parameter is less than a preset distance threshold, where the target electronic device is located in the local area network. A communication link corresponding to the wireless local area network of the at least one second communication link is selected as the at least one target communication link, upon detecting that the at least one second communication link includes the communication link corresponding to the wireless local area network.

After selecting the communication link corresponding to the wireless local area network of the at least one second communication link as the at least one target communication link, the following is further executed. The electronic device sends a notification message to the target electronic device, where the notification message is used for the target electronic device to establish, according to the notification message, the communication link corresponding to the wireless local area network, to realize the data transmission between the electronic device through the communication link corresponding to the wireless local area network.

In the implementation, when detecting that the distance parameter is less than the preset distance threshold, by detecting the wireless local area network where both the electronic device and the target electronic device locate, the electronic device selects the corresponding communication link, rather than selecting a wide area network used by the majority of people, for data transmission, which can increase the data transmission speed.

Figure 3:
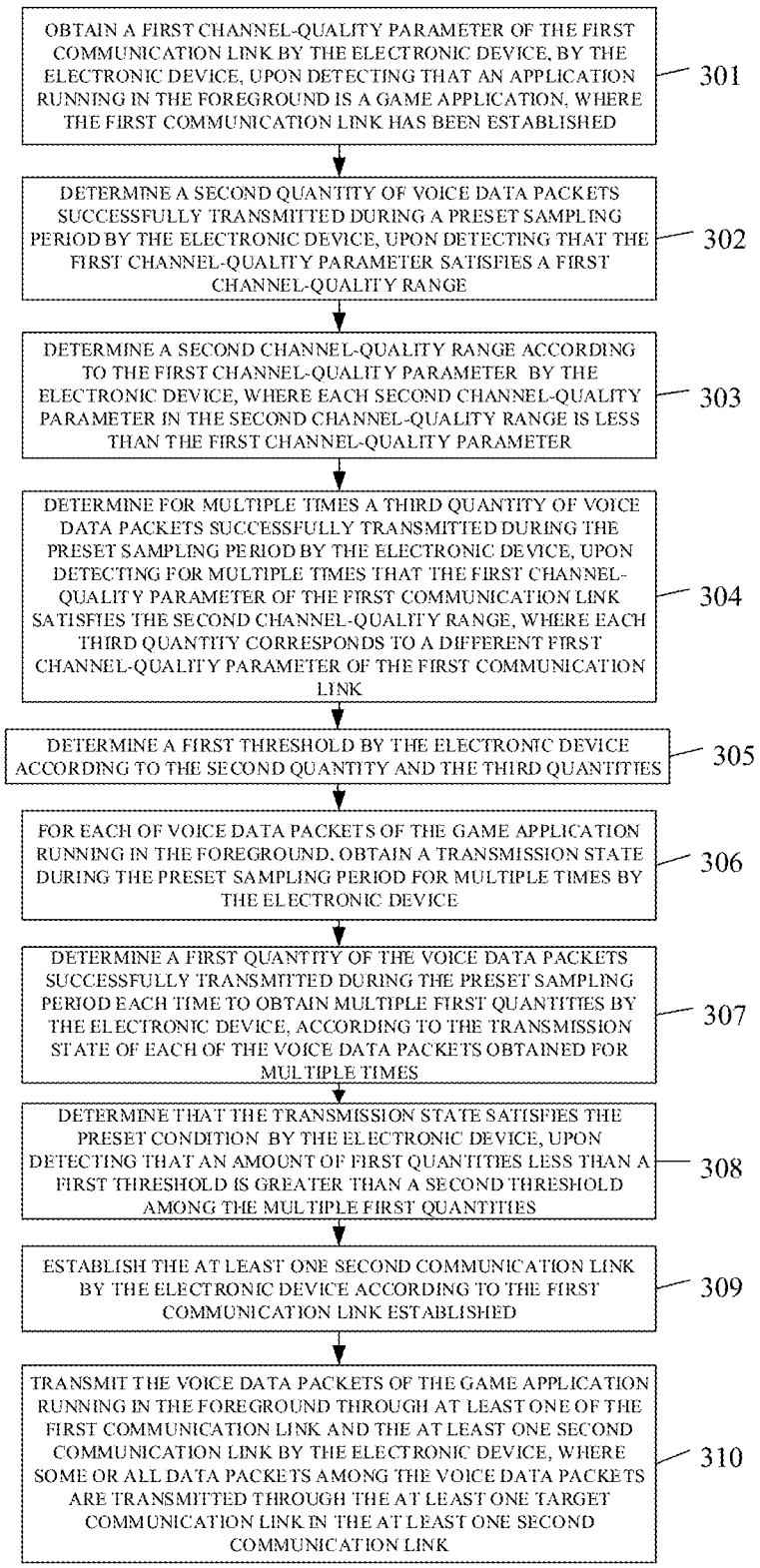
FIG. 3 is a schematic flow chart illustrating a method for data transmission provided by other implementations of this application.

In accordance with the implementations illustrated in FIG. 2, reference is made to FIG. 3. FIG. 3 is a schematic flow chart illustrating a method for data transmission provided by other implementations of this application, which is implemented in the electronic device in FIG. 1. As illustrated in FIG. 3, the method for data transmission includes the following.

At 301, the electronic device obtains a first channel-quality parameter of a first communication link, upon detecting that an application running in a foreground is a game application, where the first communication link has been established by the electronic device.

At 302, the electronic device determines a second quantity of voice data packets successfully transmitted during a preset sampling period, upon detecting that the first channel-quality parameter satisfies a first channel-quality range.

At 303, the electronic device determines a second channel-quality range according to the first channel-quality parameter, where each second channel-quality parameter in the second channel-quality range is less than the first channel-quality parameter.

At 304, the electronic device determines for multiple times a third quantity of voice data packets successfully transmitted during the preset sampling period, upon detecting for multiple times that the first channel-quality parameter of the first communication link satisfies the second channel-quality range, where each third quantity corresponds to a different first channel-quality parameter of the first communication link.

At 305, the electronic device determines a first threshold according to the second quantity and the third quantities.

At 306, for each of voice data packets of the game application running in the foreground, the electronic device obtains a transmission state during the preset sampling period for multiple times.

At 307, the electronic device determines a first quantity of voice data packets successfully transmitted during the preset sampling period each time to obtain multiple first quantities, according to the transmission state of each of the voice data packets obtained for multiple times.

At 308, the electronic device determines that the transmission state satisfies the preset condition, upon detecting that an amount of first quantities less than a first threshold is greater than a second threshold among the multiple first quantities.

The transmission state satisfying the preset condition means that the first communication link suffers from a large network delay or is unstable.

At 309, the electronic device establishes at least one second communication link according to the first communication link established.

At 310, the electronic device transmits the voice data packets of the game application running in the foreground through at least one of the first communication link and the at least one second communication link, where some or all data packets among the voice data packets are transmitted through at least one target communication link in the at least one second communication link.

In the implementation, the electronic device obtains the transmission state of the voice data packets of the game application running in the foreground, and when the transmission state is detected to satisfy the preset condition, the electronic device determines the first communication link established by the electronic device and establishes the at least one second communication link, where the transmission state satisfying the preset condition indicates that the first communication link suffers from the large network delay or is unstable. Finally, the electronic device transmits the voice data packets of the game application running in the foreground through the at least one of the first communication link and the at least one second communication link, where some or all data packets among the voice data packets are transmitted through at least one target communication link in the at least one second communication link. It can be seen that, when the electronic device detects that the transmission state of the voice data packets of the game application running in the foreground satisfies the preset condition, the electronic device determines that the established first communication link suffers from the large network delay or is unstable, and in this case, the electronic device immediately establishes the at least one second communication link to help the first communication link transmit the voice data packets, which is possible to reduce a transmission delay of the voice data packets and improve a transmission speed.

In addition, the electronic device determines whether the transmission state of the voice data packets of the game application running in the foreground satisfies the preset condition according to the first quantity of the voice data packets successfully transmitted during the preset sampling period obtained for multiple times, rather than for one time, which can improve an accuracy of determining a current network state and thus improve the stability of the data transmission.

In addition, before obtaining the transmission state of the voice data packets of the game application running in the foreground, when the corresponding game application is running in the foreground of the electronic device, the electronic device will first obtain the second quantity of the voice data packets transmitted successfully when the channel quality of the first communication link is high, and then obtain multiple times the third quantities when the channel quality of the first communication link is low. Thereafter, the first threshold when the second communication link needs to be established is determined. In this way, occasions for data transmission through multiple links can be reasonably determined. Furthermore, the first threshold can also be accurately set, since the second channel-quality range is determined according to the first channel-quality parameter.

Figure 4:
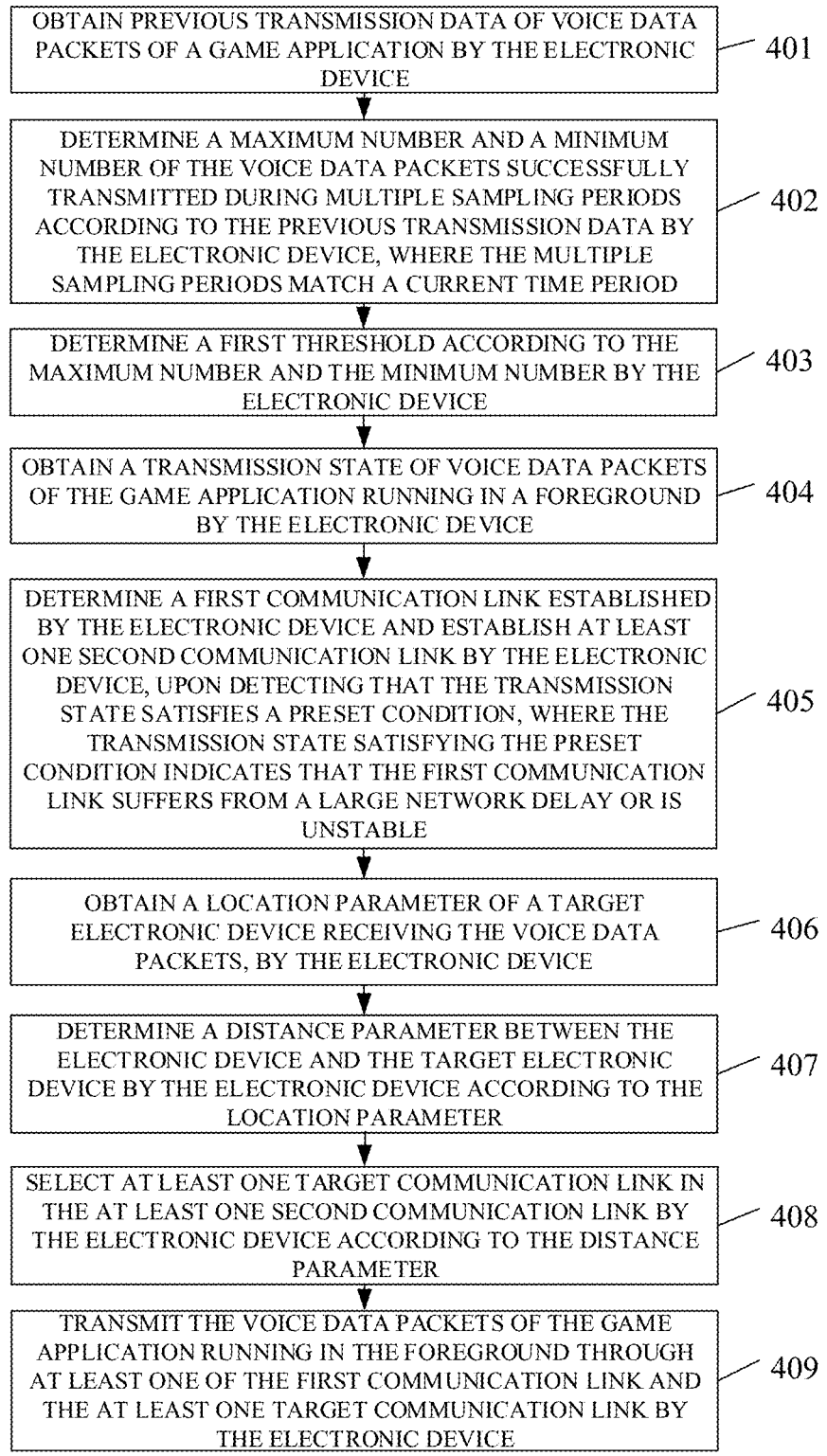
FIG. 4 is a schematic flow chart illustrating a method for data transmission provided by other implementations of this application.

In accordance with the implementations illustrated in FIG. 2, reference is made to FIG. 4. FIG. 4 is a schematic flow chart illustrating a method for data transmission provided by other implementations of this application, which is implemented in an electronic device in FIG. 1. Multiple wireless communication links are established in the electronic device. As illustrated in FIG. 4, the method for data transmission includes the following.

At 401, the electronic device obtains previous transmission data of voice data packets of a game application.

At 402, the electronic device determines a maximum number and a minimum number of voice data packets successfully transmitted during multiple sampling periods according to the previous transmission data, where the multiple sampling periods match a current time period.

At 403, the electronic device determines a first threshold according to the maximum number and the minimum number.

At 404, the electronic device obtains a transmission state of voice data packets of the game application running in a foreground.

At 405, the electronic device determines a first communication link established by the electronic device and establishes at least one second communication link, upon detecting that the transmission state satisfies a preset condition, where the transmission state satisfying the preset condition indicates that the first communication link suffers from a large network delay or is unstable.

At 406, the electronic device obtains a location parameter of a target electronic device receiving the voice data packets.

At 407, the electronic device determines a distance parameter between the electronic device and the target electronic device according to the location parameter.

At 408, the electronic device selects at least one target communication link in the at least one second communication link according to the distance parameter.

At 409, the electronic device transmits the voice data packets of the game application running in the foreground through at least one of the first communication link and the at least one target communication link.

In the implementation, the electronic device obtains the transmission state of voice data packets of the game application running in the foreground, and when the transmission state is detected to satisfy the preset condition, the electronic device determines the first communication link established by the electronic device and establishes the at least one second communication link, where the transmission state satisfying the preset condition indicates that the first communication link suffers from the large network delay or is unstable. Finally, the electronic device transmits the voice data packets of the game application running in the foreground through the at least one of the first communication link and the at least one second communication link, where some or all data packets among the voice data packets are transmitted through the at least one target communication link in the at least one second communication link. It can be seen that, when the electronic device detects that the transmission state of the voice data packets of the game application running in the foreground satisfies the preset condition, the electronic device determines that the established first communication link suffers from the large network delay or is unstable, and in this case, the electronic device immediately establishes the at least one second communication link to help the first communication link transmit the voice data packets, which is possible to reduce a transmission delay of the voice data packets and improve a transmission speed.

The electronic device selects the at least one target communication link according to the distance parameter between the electronic device and the target electronic device, which can improve the accuracy of selecting the target communication link and thus increase the data transmission speed.

In addition, the electronic device determines the first threshold according to the previous transmission data of the voice data packets of the game application, such that the first threshold can be determined more intelligently. Furthermore, since each communication link has different transmission speed and bandwidth, etc., during different time periods, the first threshold is determined with regard to different time periods, and thus the first threshold can be determined more reasonably.

Figure 5:
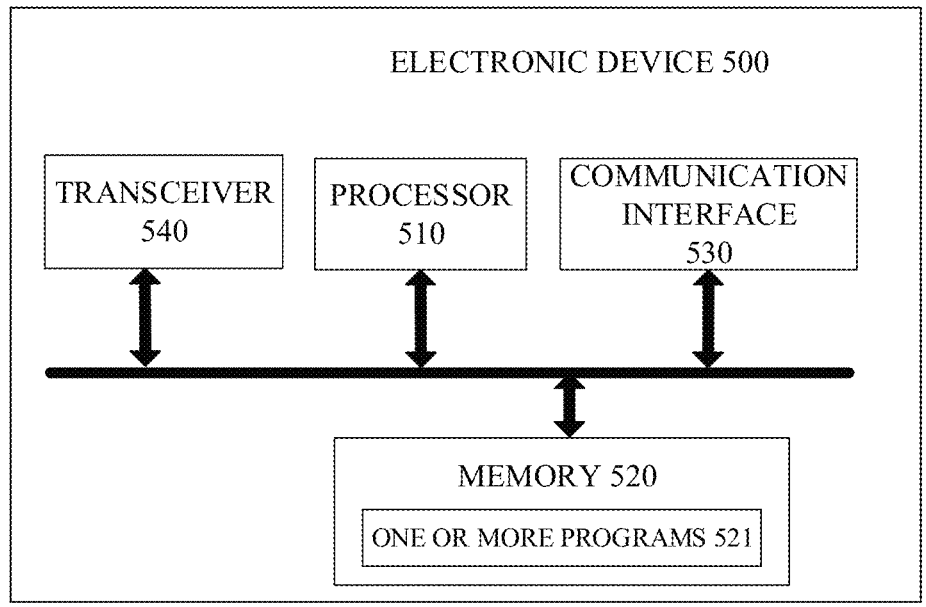
FIG. 5 is a schematic structural diagram illustrating an electronic device provided by implementations of this application.

In accordance with the implementations illustrated in FIG. 2, FIG. 3, and FIG. 4, reference is made to FIG. 5. FIG. 5 is a schematic structural diagram illustrating an electronic device 500 provided by implementations of this application. As illustrated in FIG. 5, the electronic device 500 includes a transceiver 540, at least one processor (for example, a processor 510), a memory 520 configured to store computer executable instructions (for example, one or more programs 521), and a communication interface 530. The one or more programs 521 are configured to be executed by the processor 510 and include instructions configured to execute the following.

A transmission state of voice data packets of a game application running in a foreground of the electronic device is obtained. A first communication link established by the electronic device is determined and at least one second communication link is established, upon detecting that the transmission state satisfies a preset condition, where the transmission state satisfying the preset condition indicates that the first communication link suffers from a large network delay or is unstable. The voice data packets of the game application running in the foreground are transmitted through at least one of the first communication link and the at least one second communication link, where some or all data packets among the voice data packets are transmitted, with the transceiver, through at least one target communication link in the at least one second communication link.

In the implementation, the electronic device obtains the transmission state of the voice data packets of the game application running in the foreground, and when the transmission state is detected to satisfy the preset condition, the electronic device determines the first communication link established by the electronic device and establishes the at least one second communication link, where the transmission state satisfying the preset condition indicates that the first communication link suffers from the large network delay or is unstable. Finally, the electronic device transmits the voice data packets of the game application running in the foreground through the at least one of the first communication link and the at least one second communication link, where some or all data packets among the voice data packets are transmitted through at least one target communication link in the at least one second communication link. It can be seen that, when the electronic device detects that the transmission state of the voice data packets of the game application running in the foreground satisfies the preset condition, the electronic device determines that the established first communication link suffers from the large network delay or is unstable, and in this case, the electronic device immediately establishes the at least one second communication link to help the first communication link transmit the voice data packets, which is possible to reduce a transmission delay of the voice data packets and improve a transmission speed.

In at least one implementation, in terms of obtaining the transmission state of the voice data packets of the game application running in the foreground, the instructions of the one or more programs 521 are configured to execute the following operations. For each of the voice data packets of the game application running in the foreground, the transmission state during a preset sampling period is obtained for multiple times. In terms of detecting the transmission state to satisfy the preset condition, the instructions of the one or more programs 521 are configured to execute the following operations. A first quantity of voice data packets successfully transmitted during the preset sampling period each time is determined to obtain multiple first quantities, according to the transmission state of each of the voice data packets obtained for multiple times. It is detected that an amount of first quantities less than a first threshold is greater than a second threshold among the multiple first quantities.

In at least one implementation, the one or more programs 521 further include instructions configured to execute the following operations. A first channel-quality parameter of the first communication link is obtained, upon detecting that an application running in the foreground is the game application. A second quantity of voice data packets successfully transmitted during a preset sampling period is determined, upon detecting that the first channel-quality parameter satisfies a first channel-quality range. A second channel-quality range is determined according to the first channel-quality parameter, where each second channel-quality parameter in the second channel-quality range is less than the first channel-quality parameter. A third quantity of voice data packets successfully transmitted during the preset sampling period is determined for multiple times, upon detecting for multiple times that the first channel-quality parameter of the first communication link satisfies the second channel-quality range, where each third quantity corresponds to a different first channel-quality parameter of the first communication link. The first threshold is determined according to the second quantity and the third quantities.

In at least one implementation, the one or more programs 521 further include instructions configured to execute the following operations. Previous transmission data of the voice data packets of the game application is obtained. According to the previous transmission data, a maximum number and a minimum number of voice data packets successfully transmitted during multiple sampling periods are determined, where the multiple sampling periods match a current time period. The first threshold is determined according to the maximum number and the minimum number.

In the implementation, in terms of determining the first threshold according to the maximum number and the minimum number, the instructions of the one or more programs 521 are configured to execute the following operations. An average value of the maximum number and the minimum number is determined as the first threshold, upon detecting that a difference between the maximum number and the minimum number is larger than a preset difference threshold. Alternatively, the minimum number is determined as the first threshold, upon detecting that the difference between the maximum number and the minimum number is less than or equals the preset difference threshold.

In at least one implementation, in terms of transmitting the voice data packets of the game application running in the foreground through the at least one of the first communication link and the at least one second communication link, the instructions of the one or more programs 521 are configured to execute the following operations. A location parameter of a target electronic device receiving the voice data packets is obtained. A distance parameter between the electronic device and the target electronic device is determined according to the location parameter. The at least one target communication link in the at least one second communication link is selected according to the distance parameter. The voice data packets of the game application running in the foreground are transmitted, with the transceiver, through the at least one of the first communication link and the at least one target communication link.

In the implementation, in terms of selecting the at least one target communication link in the at least one second communication link according to the distance parameter, the instructions of the one or more programs 521 are configured to execute the following operations. A wireless local area network is determined upon detecting that the distance parameter is less than a preset distance threshold, where the target electronic device is located in the local area network. A communication link is selected corresponding to the wireless local area network of the at least one second communication link as the at least one target communication link, upon detecting that the at least one second communication link includes the communication link corresponding to the wireless local area network.

The foregoing solution of the implementations of this application is mainly described from the viewpoint of execution process of the method. It can be understood that, in order to implement the above functions, the electronic device includes at least one of hardware structures or software modules corresponding to the respective functions. Those skilled in the art should readily recognize that, in combination with the example units and scheme steps described in the implementations disclosed herein, this application can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of this application, functional units may be divided for the electronic device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of this application is schematic, and is merely a logical function division, and there may be other division manners in actual implementation.

Figure 6:
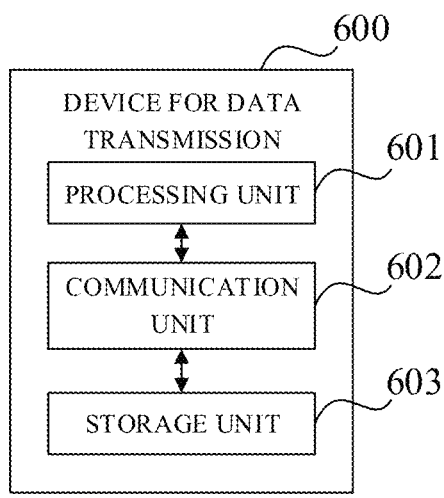
FIG. 6 is a block diagram illustrating functional units of a device for data transmission provided by implementations of this application.

FIG. 6 is a block diagram illustrating functional units of a device 600 for data transmission provided by implementations of this application. The device 600 for data transmission, which is implemented in an electronic device, includes a processing unit 601 and a communication unit 602.

The processing unit 601 is configured to obtain a transmission state of voice data packets of a game application running in a foreground, determine a first communication link currently established by the electronic device and establish at least one second communication link, upon detecting that the transmission state satisfies a preset condition, where the transmission state satisfying the preset condition indicates that the first communication link suffers from a large network delay or is unstable, and transmit, with the communication unit 602, the voice data packets of the game application running in the foreground through at least one of the first communication link and the at least one second communication link, where some or all data packets among the voice data packets are transmitted through at least one target communication link in the at least one second communication link.

The device 600 for data transmission can further includes a storage unit 603, configured to store a program code and data of the electronic device. The processing unit 601 may be a processor. The communication unit 602 may be a touch display screen, an antenna, a transmitter, a receiver, or a transceiver. The storage unit 603 may be a memory.

In the implementation, the electronic device obtains the transmission state of the voice data packets of the game application running in the foreground, and when the transmission state is detected to satisfy the preset condition, the electronic device determines the first communication link currently established by the electronic device and establishes the at least one second communication link, where the transmission state satisfying the preset condition indicates that the first communication link suffers from the large network delay or is unstable. Finally, the electronic device transmits the voice data packets of the game application running in the foreground through the at least one of the first communication link and the at least one second communication link, where some or all data packets among the voice data packets are transmitted through at least one target communication link in the at least one second communication link. It can be seen that, when the electronic device detects that the transmission state of the voice data packets of the game application running in the foreground satisfies the preset condition, the electronic device determines that the currently established first communication link suffers from the large network delay or is unstable, and in this case, the electronic device immediately establishes the at least one second communication link to help the first communication link transmit the voice data packets, which is possible to reduce a transmission delay of the voice data packets and improve a transmission speed.

In at least one implementation, in terms of obtaining the transmission state of the voice data packets of the game application running in the foreground, the processing unit 601 is configured to, for each of the voice data packets of the game application running in the foreground, obtain the transmission state during a preset sampling period for multiple times. In terms of detecting the transmission state to satisfy the preset condition, the processing unit 601 is configured to: determine a first quantity of voice data packets successfully transmitted during the preset sampling period each time to obtain multiple first quantities, according to the transmission state of each of the voice data packets obtained for multiple times, and determine that the transmission state satisfies the preset condition, upon detecting that an amount of first quantities less than a first threshold is greater than a second threshold among the multiple first quantities.

In at least one implementation, the processing unit 601 is further configured to: before obtaining the transmission state of the voice data packets of the game application running in the foreground, obtain a first channel-quality parameter of the first communication link, upon detecting that an application running in the foreground is the game application, determine a second quantity of voice data packets successfully transmitted during a preset sampling period, upon detecting that the first channel-quality parameter satisfies a first channel-quality range, determine a second channel-quality range according to the first channel-quality parameter, where each second channel-quality parameter in the second channel-quality range is less than the first channel-quality parameter, determine for multiple times a third quantity of voice data packets successfully transmitted during the preset sampling period, upon detecting for multiple times that the first channel-quality parameter of the first communication link satisfies the second channel-quality range, where each third quantity corresponds to a different first channel-quality parameter of the first communication link, and determine a first threshold according to the second quantity and the third quantities.

In at least one implementation, the processing unit 601 is further configured to: before obtaining the transmission state of the voice data packets of the game application running in the foreground, obtain previous transmission data of the voice data packets of the game application, determine a maximum number and a minimum number of voice data packets successfully transmitted during multiple sampling periods according to the previous transmission data, where the multiple sampling periods match a current time period, and determine the first threshold according to the maximum number and the minimum number.

In the implementation, in terms of determining the first threshold according to the maximum number and the minimum number, the processing unit 601 is configured to: determine an average value of the maximum number and the minimum number as the first threshold, upon detecting that a difference between the maximum number and the minimum number is larger than a preset difference threshold, or determine the minimum number as the first threshold, upon detecting that the difference between the maximum number and the minimum number is less than or equals the preset difference threshold.

In at least one implementation, in terms of transmitting the voice data packets of game application running in the foreground through the at least one of the first communication link, the at least one second communication link, and the communication unit 602, the processing unit 601 is configured to: obtain a location parameter of a target electronic device receiving the voice data packets through the communication unit 602, determine a distance parameter between the electronic device and the target electronic device according to the location parameter, select the at least one target communication link in the at least one second communication link according to the distance parameter, and transmit the voice data packets of the game application running in the foreground through the at least one of the first communication link and the at least one target communication link.

In the implementation, in terms of selecting the at least one target communication link in the at least one second communication link according to the distance parameter, the processing unit 601 is configured to: determine a wireless local area network where the target electronic device locates, upon detecting that the distance parameter is less than a preset distance threshold, detect whether the at least one second communication link includes a communication link corresponding to the wireless local area network, and select the communication link corresponding to the wireless local area network of the at least one second communication link as the at least one target communication link, upon detecting that the at least one second communication link includes the communication link corresponding to the wireless local area network.

Implementations of this application also provide a non-transitory computer readable storage medium. The computer readable storage medium stores computer programs for electronic data interchange which, when executed, are operable with a computer to execute all or part of the operations of any of the methods described in the above-described method implementations. The computer may include an electronic device.

Implementations of this application also provide a computer program product. The computer program product includes a non-transitory computer readable storage medium that stores computer programs. The computer programs are operable with a computer to perform all or part of the operations of any of the methods described in the above method implementations. The computer program product may be a software installation package. The computer may include an electronic device.

It is to be noted that, for the sake of simplicity, the foregoing method implementations are described as a series of action combinations, however, it will be appreciated by those skilled in the art that this application is not limited by the sequence of actions described. According to this application, certain steps or operations may be performed in other order or simultaneously. Besides, it will be appreciated by those skilled in the art that the implementations described in the specification are exemplary implementations and the actions and modules involved are not necessarily essential to this application.

In the foregoing implementations, the description of each implementation has its own emphasis. For the parts not described in detail in one implementation, reference may be made to related descriptions in other implementations.

In the implementations of this application, it is to be understood that, the apparatuses provided in implementations may be implemented in other manners. For example, the device implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of this application may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of this application essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of this application. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, Disk or CD, and so on.

The implementations are described in detail as above. The implementations are employed to elaborate the principles of this application. The description of the implementations is merely used to facilitate the understanding of the method and essential spirit of this application. It should be noted that any modifications, or improvements that can be made by those skilled in the art without departing from the spirits and principles of this application shall all be encompassed within the protection of this application.

What is claimed is:

1. A method for data transmission, performed by an electronic device and comprising:
   obtaining a transmission state of voice data packets of a game application running in a foreground of the electronic device;
   determining a first communication link established by the electronic device and establishing at least one second communication link, upon detecting that the transmission state satisfies a preset condition, wherein the transmission state satisfying the preset condition indicates that the first communication link suffers from a large network delay or is unstable; and
   transmitting the voice data packets through at least one of the first communication link and the at least one second communication link, wherein some or all data packets among the voice data packets are transmitted through at least one target communication link in the at least one second communication link, and the at least one target communication link is selected from the at least one second communication link,
   wherein obtaining the transmission state of the voice data packets comprises:
     for each of the voice data packets, obtaining the transmission state during a preset sampling period for multiple times, wherein the transmission state is a successful transmission state or a failed transmission state of each of the voice data packets during the preset sampling period; and wherein detecting that the transmission state satisfies the preset condition comprises:
determining a first quantity of voice data packets successfully transmitted during the preset sampling period each time to obtain a plurality of first quantities, according to the transmission state of each of the voice data packets obtained for multiple times; and detecting that an amount of first quantities less than a first threshold is greater than a second threshold among the plurality of first quantities.

2. The method of claim 1, further comprising:
obtaining a first channel-quality parameter of the first communication link, upon detecting that an application running in the foreground is the game application;

determining a second quantity of voice data packets successfully transmitted during the preset sampling period, upon detecting that the first channel-quality parameter satisfies a first channel-quality range;

determining a second channel-quality range according to the first channel-quality parameter, wherein each second channel-quality parameter in the second channel-quality range is less than the first channel-quality parameter;

determining for multiple times a third quantity of voice data packets successfully transmitted during the preset sampling period, upon detecting for multiple times that the first channel-quality parameter of the first communication link satisfies the second channel-quality range, wherein each third quantity corresponds to a different first channel-quality parameter of the first communication link; and determining the first threshold according to the second quantity and the third quantities.

3. The method of claim 2, wherein determining the first threshold according to the second quantity and the third quantities comprises:
determining a difference between the second quantity and each of the third quantities to obtain a plurality of differences;

obtaining at least one target difference in a preset difference range among the plurality of differences; and determining an average value of at least one third quantity corresponding to the at least one target difference as the first threshold.

4. The method of claim 1, further comprising:
obtaining previous transmission data of the voice data packets of the game application;

determining a maximum number and a minimum number of voice data packets successfully transmitted during a plurality of sampling periods according to the previous transmission data, wherein the plurality of sampling periods match a current time period; and determining the first threshold according to the maximum number and the minimum number.

5. The method of claim 4, wherein determining the first threshold according to the maximum number and the minimum number comprises:
determining an average value of the maximum number and the minimum number as the first threshold, upon detecting that a difference between the maximum number and the minimum number is larger than a preset difference threshold; or determining the minimum number as the first threshold, upon detecting that the difference between the maximum number and the minimum number is less than or equals the preset difference threshold.

6. The method of claim 1, wherein transmitting the voice data packets through the at least one of the first communication link and the at least one second communication link comprises:
obtaining a location parameter of a target electronic device receiving the voice data packets;

determining a distance parameter between the electronic device and the target electronic device according to the location parameter;

selecting the at least one target communication link in the at least one second communication link according to the distance parameter; and transmitting the voice data packets through the at least one of the first communication link and the at least one target communication link.

7. The method of claim 6, wherein selecting the at least one target communication link in the at least one second communication link according to the distance parameter comprises:
determining a wireless local area network upon detecting that the distance parameter is less than a preset distance threshold, wherein the target electronic device is located in the local area network;

selecting a communication link corresponding to the wireless local area network of the at least one second communication link as the at least one target communication link, upon detecting that the at least one second communication link comprises the communication link corresponding to the wireless local area network.

8. An electronic device comprising:
a transceiver;
at least one processor; and
a memory, coupled to the at least one processor and storing computer executable instructions thereon which, when executed by the at least one processor, causes the at least one processor to:
obtain a transmission state of voice data packets of a game application running in a foreground of the electronic device; and determine a first communication link established by the electronic device and establish at least one second communication link, upon detecting that the transmission state satisfies a preset condition, wherein the transmission state satisfying the preset condition indicates that the first communication link suffers from a large network delay or is unstable; and wherein the computer executable instructions, when executed by the at least one processor, causes the transceiver to:
transmit the voice data packets through at least one of the first communication link and the at least one second communication link, wherein some or all data packets among the voice data packets are transmitted through at least one target communication link in the at least one second communication link, and the at least one target communication link is selected from the at least one second communication link, wherein the at least one processor configured to obtain the transmission state of the voice data packets is configured to:
for each of the voice data packets, obtain the transmission state during a preset sampling period for multiple times, wherein the transmission state is a successful transmission state or a failed transmission state of each of the voice data packets during the preset sampling period; and wherein the at least one processor configured to detect that the transmission state satisfies the preset condition is configured to:
  determine a first quantity of voice data packets successfully transmitted during the preset sampling period each time to obtain a plurality of first quantities, according to the transmission state of each of the voice data packets obtained for multiple times; and
  detect that an amount of first quantities less than a first threshold is greater than a second threshold among the plurality of first quantities.

9. The electronic device of claim 8, wherein the at least one processor is further configured to:
  obtain a first channel-quality parameter of the first communication link, upon detecting that an application running in the foreground is the game application;
  determine a second quantity of voice data packets successfully transmitted during the preset sampling period, upon detecting that the first channel-quality parameter satisfies a first channel-quality range;
  determine a second channel-quality range according to the first channel-quality parameter, wherein each second channel-quality parameter in the second channel-quality range is less than the first channel-quality parameter;
  determine for multiple times a third quantity of voice data packets successfully transmitted during the preset sampling period, upon detecting for multiple times that the first channel-quality parameter of the first communication link satisfies the second channel-quality range, wherein each third quantity corresponds to a different first channel-quality parameter of the first communication link; and
  determine the first threshold according to the second quantity and the third quantities.

10. The electronic device of claim 9, wherein the at least one processor configured to determine the first threshold according to the second quantity and the third quantities is configured to:
  determine a difference between the second quantity and each of the third quantities to obtain a plurality of differences;
  obtain at least one target difference in a preset difference range among the plurality of differences; and
  determine an average value of at least one third quantity corresponding to the at least one target difference as the first threshold.

11. The electronic device of claim 8, wherein the at least one processor is further configured to:
  obtain previous transmission data of the voice data packets of the game application;
  determine a maximum number and a minimum number of voice data packets successfully transmitted during a plurality of sampling periods according to the previous transmission data, wherein the plurality of sampling periods match a current time period; and
  determine the first threshold according to the maximum number and the minimum number.

12. The electronic device of claim 11, wherein the at least one processor configured to determine the first threshold according to the maximum number and the minimum number is configured to:
  determine an average value of the maximum number and the minimum number as the first threshold, upon detecting that a difference between the maximum number and the minimum number is larger than a preset difference threshold; or
  determine the minimum number as the first threshold, upon detecting that the difference between the maximum number and the minimum number is less than or equals the preset difference threshold.

13. The electronic device of claim 8, wherein the computer executable instructions, when executed by the at least one processor, causing the transceiver to transmit the voice data packets through the at least one of the first communication link and the at least one second communication link causes the at least one processor to:
  obtain a location parameter of a target electronic device receiving the voice data packets;
  determine a distance parameter between the electronic device and the target electronic device according to the location parameter; and
  select the at least one target communication link in the at least one second communication link according to the distance parameter; and
  the transceiver to:
    transmit the voice data packets through the at least one of the first communication link and the at least one target communication link.

14. The electronic device of claim 13, wherein the at least one processor configured to select the at least one target communication link in the at least one second communication link according to the distance parameter is configured to:
  determine a wireless local area network upon detecting that the distance parameter is less than a preset distance threshold, wherein the target electronic device is located in the local area network;
  select a communication link corresponding to the wireless local area network of the at least one second communication link as the at least one target communication link, upon detecting that the at least one second communication link comprises the communication link corresponding to the wireless local area network.

15. A non-transitory computer readable storage medium storing a computer program,
  the computer program, when executed by a processor, causes the processor to:
    obtain a transmission state of voice data packets of a game application running in a foreground of an electronic device; and
    determine a first communication link established by the electronic device and establish at least one second communication link, upon detecting that the transmission state satisfies a preset condition, wherein the transmission state satisfying the preset condition indicates that the first communication link suffers from a large network delay or is unstable; and
  the computer program, when executed by the processor, causes a transceiver to:
    transmit the voice data packets through at least one of the first communication link and the at least one second communication link, wherein some or all data packets among the voice data packets are transmitted through at least one target communication link in the at least one second communication link, and the at least one target communication link is selected from the at least one second communication link, wherein the computer program executed by the processor to obtain the transmission state of the voice data packets is executed by the processor to:
- for each of the voice data packets, obtain the transmission state during a preset sampling period for multiple times, wherein the transmission state is a successful transmission state or a failed transmission state of each of the voice data packets during the preset sampling period; and wherein the computer program executed by the processor to detect that the transmission state satisfies the preset condition is executed by the processor to:
- determine a first quantity of voice data packets successfully transmitted during the preset sampling period each time to obtain a plurality of first quantities, according to the transmission state of each of the voice data packets obtained for multiple times; and
- detect that an amount of the first quantity being less than a first threshold is greater than a second threshold among the plurality of first quantities.

16. The non-transitory computer readable storage medium of claim 7, wherein the computer program, when executed by the processor, further causes the processor to:
- obtain a first channel-quality parameter of the first communication link, upon detecting that an application running in the foreground is the game application;
- determine a second quantity of voice data packets successfully transmitted during the preset sampling period, upon detecting that the first channel-quality parameter satisfies a first channel-quality range;
- determine a second channel-quality range according to the first channel-quality parameter, wherein each second channel-quality parameter in the second channel-quality range is less than the first channel-quality parameter;
- determine for multiple times a third quantity of voice data packets successfully transmitted during the preset sampling period, upon detecting for multiple times that the first channel-quality parameter of the first communication link satisfies the second channel-quality range, wherein each third quantity corresponds to a different first channel-quality parameter of the first communication link; and
- determine the first threshold according to the second quantity and the third quantities.

17. The non-transitory computer readable storage medium of claim 16, wherein the computer program executed by the processor to determine the first threshold according to the second quantity and the third quantities is executed by the processor to:
- determine a difference between the second quantity and each of the third quantities to obtain a plurality of differences;
- obtain at least one target difference in a preset difference range among the plurality of differences; and
- determine an average value of at least one third quantity corresponding to the at least one target difference as the first threshold.

* * * * *